United States Patent
Kalman

(10) Patent No.: US 7,707,582 B2
(45) Date of Patent: *Apr. 27, 2010

(54) MULTI-TASKING REAL-TIME OPERATING SYSTEM FOR MICROPROCESSORS WITH LIMITED MEMORY BY SAVING ONLY A SINGLE RETURN ADDRESS PER TASK DURING CONTEXT SWITCHING

(76) Inventor: Andrew E. Kalman, P.O. Box 20144, Sanford, CA (US) 94309

( * ) Notice: Subject to any disclaimer, the term of this patent is extended or adjusted under 35 U.S.C. 154(b) by 1568 days.

This patent is subject to a terminal disclaimer.

(21) Appl. No.: 10/986,270

(22) Filed: Nov. 10, 2004

(65) Prior Publication Data

US 2005/0102650 A1    May 12, 2005

Related U.S. Application Data

(63) Continuation of application No. 09/492,242, filed on Jan. 27, 2000, now Pat. No. 6,823,517.

(51) Int. Cl.
    *G06F 9/46*    (2006.01)
(52) U.S. Cl. ................... 718/108; 718/100; 718/102; 718/107
(58) Field of Classification Search ................. 718/108, 718/102, 100, 107
    See application file for complete search history.

(56) References Cited

U.S. PATENT DOCUMENTS

| | | | |
|---|---|---|---|
| 5,202,991 A | 4/1993 | Gamache et al. | |
| 5,283,900 A | 2/1994 | Frankel et al. | |
| 5,295,265 A | 3/1994 | Ducateau et al. | |
| 5,721,922 A | 2/1998 | Dingwall | |
| 5,768,599 A | 6/1998 | Yokomizo | |
| 5,946,487 A | 8/1999 | Dangelo | |
| 6,061,709 A | 5/2000 | Bronte | |
| 6,061,711 A | 5/2000 | Song et al. | |
| 6,279,046 B1 * | 8/2001 | Armstrong et al. | 710/5 |
| 6,385,637 B1 | 5/2002 | Peters et al. | |
| 6,430,594 B1 | 8/2002 | Akiyama et al. | |
| 6,466,962 B2 | 10/2002 | Bollella | |
| 6,553,487 B1 * | 4/2003 | Sukonik et al. | 712/228 |

OTHER PUBLICATIONS

U.S. Appl. No. 09/492,242, Andrew E. Kalman.

* cited by examiner

*Primary Examiner*—Meng-Ai An
*Assistant Examiner*—Kenneth Tang
(74) *Attorney, Agent, or Firm*—Donald R. Boys; Central Coast Patent Agency, Inc.

(57) ABSTRACT

A real-time operating system (RTOS) for use with minimal-memory controllers has a kernel for managing task execution, including context switching, a plurality of defined tasks, individual ones of the tasks having subroutines callable in nested levels for accomplishing tasks. In the RTOS context switching is constrained to occur only at task level, and cannot occur at any lower sub-routine level. This system can operate with a single call . . . return stack, saving memory requirement. The single stack can be implemented as either a general-purpose stack or as a hardware call . . . return stack. In other embodiments novel methods are taught for generating return addresses, and for using timing functions in a RTOS.

20 Claims, 8 Drawing Sheets

| address | assembly language listing | action / comment |
|---|---|---|
| 0x0244 | movwf PORTB | last instruction before obtaining start/resume address |
| 0x0245 | movlw low(resumeHere) | W = 0x4A |
| 0x0246 | movwf startResumeAddr | startResumeAddr = 0x??4A |
| 0x0247 | movlw high(resumeHere) | W = 0x02 |
| 0x0248 | movwf startResumeAddr+1 | startResumeAddr = 0x024A |
| 0x0249 | return | return (to scheduler) |
| 0x024A | resumeHere: | label (address of next instruction) |
| 0x024B | call subroutine G | next instruction in task |
| 0x024C | movlw low(resumeThere) | W = 0x50 |
| 0x024D | movwf startResumeAddr | startResumeAddr = 0x0250 |
| 0x024E | movlw high(resumeThere) | W = 0x02 |
| 0x024F | movwf startResumeAddr+1 | startResumeAddr = 0x0250 |
| | return | return (to scheduler) |
| 0x0250 | resumeThere: | label (address of next instruction) |
| | movlw 0 | next instruction in task |
| ... | | | obtaining tasks start/resume address (0x0245–0x0249)

obtaining tasks start/resume address (0x024C–0x024F)

macro (in pseudo-code):

```
macro label
   movlw low(label)
   movwf startResumeAddr
   movlw high(label)
   movwf startResumeAddr+1
label:
   return
end macro
```

*Fig. 5*

| State of Tasks in Group: | $T_A$ | $T_B$ | $T_C$ | $T_D$ | $T_E$ | $T_F$ | $T_G$ | $T_H$ | $T_I$ |
|---|---|---|---|---|---|---|---|---|---|
| Eligible: | 1 | 0 | 1 | 0 | 0 | 1 | 0 | 0 | 1 |
| Delayed: | 0 | 0 | 0 | 1 | 1 | 0 | 0 | 0 | 0 |
| Waiting on Event #1: | 0 | 1 | 0 | 0 | 0 | 0 | 0 | 1 | 0 |
| Waiting on Event #2: | 0 | 0 | 0 | 0 | 0 | 0 | 1 | 0 | 0 |
| Waiting on Event #3: | 0 | 0 | 0 | 0 | 0 | 0 | 0 | 0 | 0 |

Etc.

*Fig. 6*

MULTI-TASKING REAL-TIME OPERATING SYSTEM FOR MICROPROCESSORS WITH LIMITED MEMORY BY SAVING ONLY A SINGLE RETURN ADDRESS PER TASK DURING CONTEXT SWITCHING

CROSS-REFERENCE TO RELATED DOCUMENTS

The present application is a continuation application of patent application Ser. No. 09/492,242 filed on Jan. 27, 2000, now U.S. Pat. No. 6,823,517 which is incorporated in its entirety by reference.

FIELD OF THE INVENTION

The present invention is in the area of methods for controlling systems with microcontrollers and microprocessors, including software, and pertains more particularly to real-time operating systems for use with microprocessors and controllers.

BACKGROUND OF THE INVENTION

As is well-known in the art, general-purpose microprocessors and microcontrollers are used in system control, and to apply the intelligence of such processors to real systems is often achieved with software under the control of some sort of an operating system (OS). An OS is a high-level computer program implemented as either software or firmware in operating a microcontroller or microprocessor in conjunction with system sensors (input) and operators (output), and coded subroutines in performing systems tasks. The OS provides a framework and imposes operating rules and constraints in integrating subroutines in accomplishing specific system tasks. Programmers have at their disposal a variety of programming models to choose from when creating hardware/software control systems, which comprise programs (software) which run on the microprocessors and microcontrollers (hardware).

For reference in understanding the present invention the inventor incorporates herein by reference the following book:

Many of the terms and concepts used in this application may be better understood with reference to this book.

Two significant models that dictate overall behavior of a comprehensive program are the foreground-background loop and kernel-based multitasking. Each of these models is explained in some detail in the attached Appendix. In both models, the flow of program execution is governed by actions and events. A program which employs a foreground-background loop performs actions repetitively, sequentially and indefinitely (hence the loop). For example, for three actions A, B and C, the sequence of execution for a foreground/background-type program is as shown in the time diagram of FIG. 1. The sequence is from left to right in advancing time, and it is seen that actions A, B, and C repeat in sequence endlessly.

Because this sequence is fixed sequentially, because each action must run until completion, and because the time between successive same actions can be of long duration, the actions in the loop are not well-suited to providing rapid responses to external events. Instead, interrupts are often used to perform time-critical actions in response to external (e.g. keypresses) or internal (e.g. repetitive timer) events. An interrupt I might occur in the loop illustrated as FIG. 1, as shown in FIG. 2. It is seen that the normal sequence of operations may be interrupted any number of times, and, when the interrupt is finished, the sequence resumes where it left off. The interrupts, indicated as I in every case, although there may be more than one kind of interrupt, may occur of course at any point in the loop progression.

Because the loop system's response to an interrupt-driven event is much faster than the time between successive same actions, A-to-A for example, the interrupts are said to occur in the foreground, and the actions in the loop occur in the background. Interrupts can be of several sorts, as mentioned above, and are often used as a mechanism to pass information (e.g. an event has occurred) from the foreground to the background, where the event may be acted upon. The use of global variables and the selective control of interrupts are two of several methods employed to communicate between the foreground and the background in looped systems.

An important advantage of a foreground-background architecture is that such an architecture is relatively simple when a small number of actions are involved. However, as the complexity of a system rises, it is generally accepted in the art that a foreground-background system becomes increasingly difficult to understand, to properly characterize, and to expand and maintain. The inflexibility of the task execution sequence results in response time(s) suffering as well. Foreground-background loop systems can be extended via the use of state machines in order to control the sequencing of actions, but ultimately such an architecture affords the programmer inadequate flexibility in maximizing the system's performance and tailoring its responsiveness.

To counter the problem of unresponsive foreground/background-type systems, the notion of kernel-based multitasking was developed. Among the goals of kernel-based multitasking is to make efficient use of the processor's power, to maximize the system's event-response time, to manage complexity, and to provide for reliable communications between different parts of the overall program.

In kernel-based multitasking, actions in the form of independent subprograms are referred to as tasks (or threads or processes, etc.), and a notion of task priorities is introduced. The kernel is a small sub-program which ensures that the highest-priority task is always the one about to run or actually. Task switching, occurs when the running task relinquishes (in a cooperative system) or is forced to relinquish (in a preemptive system) control of the processor's resources (e.g. program counter and possibly other, typically memory, resources) to another task, which then takes control and begins executing. (This is a process which will be quite familiar to those with skill in the art of higher-power microprocessors). Task switches are managed by the kernel. A context switch generally suspends or stops one task and resumes or starts another, and additionally saves the context of the suspended task so that the task, when resumed, may continue where it was suspended with its entire context (e.g. all of the processor's internal registers) unchanged from when it was suspended.

For example, for three tasks A, B and C with decreasing priorities, the sequence of execution for a kernel-driven, multitasking system might be as shown in FIG. 3. Notice that in the sequence shown in FIG. 3 some instances of task execution complete before another task starts. For example, task B initially runs to completion because its priority exceeds that of task C, and the multitasking kernel has not yet made task A eligible to run. However, the next time task B runs it is suspended while the higher-priority task A runs to completion, whereupon task B resumes running.

This task execution by priority is one of the hallmarks of kernel-based multitasking. Interrupts may also be interspersed within the above sequence. Finally, events are used as a means of communicating among tasks or between tasks and internal and external stimuli.

Another type of multitasking is time-sliced multitasking. Time-sliced multitasking controls task execution based on an additional parameter, namely the amount of time each task is allowed to run. This type of multitasking is also managed by a kernel.

A kernel's behavior can often be characterized precisely enough to specify in a fully deterministic manner how long any operation (e.g. a context switch) will take. Such a kernel is said to provide real-time multitasking. The combination of such a kernel and all the accompanying task and event functionality is known in the art as a real-time operating system (RTOS). The present invention is an RTOS.

RTOS tasks exist independently of one another. Global variables and interrupt control are used for simple intercommunication. More sophisticated intercommunication is accomplished in such a system via events such as semaphores, messages and message queues, whose behavior is controlled by the RTOS. When and how long a task runs is governed by its priority, the system's other tasks, the occurrence of events and other factors (e.g. the control of interrupts). Context switches occur for a variety of reasons, including the need for a higher priority task to run, the desire to delay a task for a specified time interval, or an attempt to communicate with a task when the desired information is not (yet) available. A context switch changes the running state of the current task to be either eligible, delayed, waiting, stopped, etc. In a preemptive system, a context switch may occur at any random time and at any subroutine call depth in the task. The depth at which context switches may occur is important in the present invention.

A cooperative system is similar to the pre-emptive system described above, but a context switch may only occur when and where the programmer has requested or allowed a context switch to occur. Since, when a subroutine or task is preempted in either type system, its return addresses are normally kept on a stack, the kernel must maintain a separate stack for each task so that when a task resumes, its subroutines are able to return back up the call tree. Context-sensitive information (e.g. the task's resume address and register values) is often also saved on the task stack.

As an example, a task T1 may call subroutines S1__1 and S1__2. Subroutine S1__1 may itself call subroutines S1__1__1 and S1__1__2, and subroutine S1__1__2 may call a subroutine S1__1__2__1. Task T1's call tree will look like:

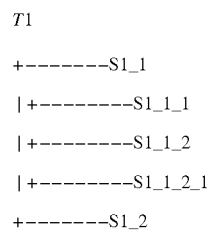

When a context switch occurs in subroutine S1__1__2__1 while task T1 is running, task T1's call . . . return stack will contain

```
top of stack -> return address in S1__1__2
                return address in S1__1
                return address in T1
```

This call . . . return stack is unique to task T1. When task T1 resumes after this context switch, each subroutine must successfully return to the position from where it was called in order for task T1 to continue executing properly. The kernel is responsible for managing all the stacks in the RTOS.

Architecture dictates the capabilities of a processor's stack. In a general-purpose stack (e.g. Motorola 68000 series microprocessors), the size of the stack is limited only by available RAM. Because the stack's contents are not constrained, a general-purpose stack can include subroutine return addresses. An RTOS allocates task stack memory based partially on the amount of memory required to store return addresses for the expected maximum call depth. As maximum call depth and/or the number of tasks in a system grows, so do its RAM requirements. RAM requirements per task for a typical RTOS range from hundreds of bytes to kilobytes or in some cases even megabytes per task. An RTOS may also allocate additional memory on a per-task basis fur task-specific information, e.g. its priority and context-saving information.

Given the above descriptions, as current RTOS design presupposes the existence of one or more general-purpose stacks or similar memory blocks for the saving of return addresses, the RAM requirements of such an RTOS are a direct consequence of the RTOS' support for context switching at any call depth.

The typically very large RAM requirement for an RTOS supporting context switching at any call depth effectively preclude the use of an RTOS in a class of processors (usually microcontrollers) which have very little RAM, from tens to hundreds to perhaps as much as a few kilobytes of RAM. Such processors may have a general-purpose stack, or they may have a single hardware call . . . return stack, which provides for a restricted subroutine call depth (often limited to 2-16 levels), with only return addresses stored on the stack. In either case there is too little memory to devote to individual task stacks.

Thus the memory-hungry nature of a conventional RTOS precludes use of such an operating systems with memory-challenged microcontrollers. What is therefore clearly needed is an RTOS that may be used with such controllers, which would significantly increase the range of uses for such controllers, and allow system design for sophisticated systems using less expensive controllers than would otherwise be the case.

SUMMARY OF THE INVENTION

In a preferred embodiment of the present invention a real-time operating system (RTOS) for use with minimal-memory controllers is provided, comprising a kernel for managing task execution, including context switching, and a plurality of defined tasks as code sets, individual ones of the tasks having subroutines callable in nested levels for accomplishing tasks. The kernel constrains context switching to occur only task level, rather than allowing context switches at lower subroutine level.

In a preferred embodiment the RTOS operates with a single call-return stack common to all of the defined tasks, and the one stack may be implemented as a general-purpose stack, or as a hardware call . . . return stack. There may also be a specific task control block assigned to each task, wherein a single task-resume address is saved, and/or task-specific information is saved.

In a preferred embodiment of the invention a task-resume address is obtained in a context switch by placing a label at the point where the task is to resume, and obtaining the address of the label and storing that address as the task-resume address. Multiple labels may be used within a single task to accomplish multiple context switches.

In yet another embodiment of the present invention a wait-on-event function is provided wherein the function is called only at task-level, returns a value based on whether an event is available or not, and initiates a context switch or not based on the returned value. The wait-on-event function in some embodiments is enclosed within a (while) loop at task level, and characterized in that the task calls the wait-on-event function in the loop and examines its return code, exiting the loop if the event is available and initiates a context switch if not, and in the event of a context switch, the task recalls the wait-on-event function after resumption, being still in the loop, and repeats this procedure until exiting the loop.

In another aspect of the present invention a method for operating a minimal-memory controller is provided, comprising steps of (a) executing by the controller a real-time operating system (RTOS) based on kernel-controlled multitasking; (b) calling defined tasks by the kernel, with individual ones of the tasks calling component subroutines; and (c) constraining context-switching to occur solely at the task level rather than at any lower sub-routine level.

In preferred embodiments the RTOS operates with a single call-return stack common to all of the defined tasks, and the single stack can be implemented as either a hardware or as a general-purpose stack.

In some embodiments of the method a specific task control block is assigned to each task, wherein a single task-resume address is saved. Also in some embodiments of the method a task-resume address is obtained in a context switch by placing a label at the point where the task is to resume, and obtaining the address of the label and storing that address as the task-resume address. Multiple labels may be used within a single task to accomplish multiple context switches.

In other embodiments of the method a wait-on-event function is provided, characterized in that the function is called only at task-level, returns a value based on whether an event is available or not, and initiates a context switch or not based on the returned value. This wait-on-event function may be enclosed within a (while) loop at task level, and the task may call the wait-on-event function in the loop and examine its return code, exiting the loop if the event is available and initiates a context switch if not, and in the event of a context switch, the task may recall the wait-on-event function after resumption, being still in the loop, and repeat this procedure until exiting the loop.

In various embodiments of the invention, taught in enabling detail below, for the first time a RTOS is provided that may operate efficiently for processors with limited memory capacity, using only a single general-purpose or hardware call-return stack.

BRIEF DESCRIPTION OF THE DRAWING FIGURES

FIG. 5 illustrates an example of use of a label to obtain a task's start . . . resume address in an embodiment of the present invention.

FIG. 6 illustrates a list in the art list in which three types of arrays are used.

DESCRIPTION OF THE PREFERRED EMBODIMENTS

In a preferred embodiment of the present invention a unique RTOS is provided which does not require a general-purpose stack, including a specific stack dedicated to each task, and therefore does not require the large amount of RAM that multiple task stacks require. This new and unique RTOS will be designated for the purpose of avoiding confusion, in further description below as the XRTOS. The XRTOS requires only a single call . . . return stack of modest depth irrespective of the number of tasks. There is no need for a specific stack for each task.

For the XRTOS the single call . . . return stack can be implemented as either a general-purpose stack or as a hardware call . . . return stack. Instead of dedicating a task stack to each task for return addresses and context saving, the XRTOS dedicates a single task control block to each task. This task control block contains a single task resume address, context-saving information (if required) and other task-specific information. By saving only this information, the task's memory requirements are substantially reduced, often by one or more orders of magnitude.

The XRTOS is able to provide much of conventional RTOS functionality by imposing a single constraint on task switching, that constraint being that context switching may only occur at a single level (the task level), and not within any of the task's subroutines. The programmer must not attempt or allow context switches outside of the task body. This is a direct consequence of only a single return address per task.

Restricting tasks to context-switch only at the task level has no effect on the calling of subroutines and the subroutine call depth of the system.

Figure 4:
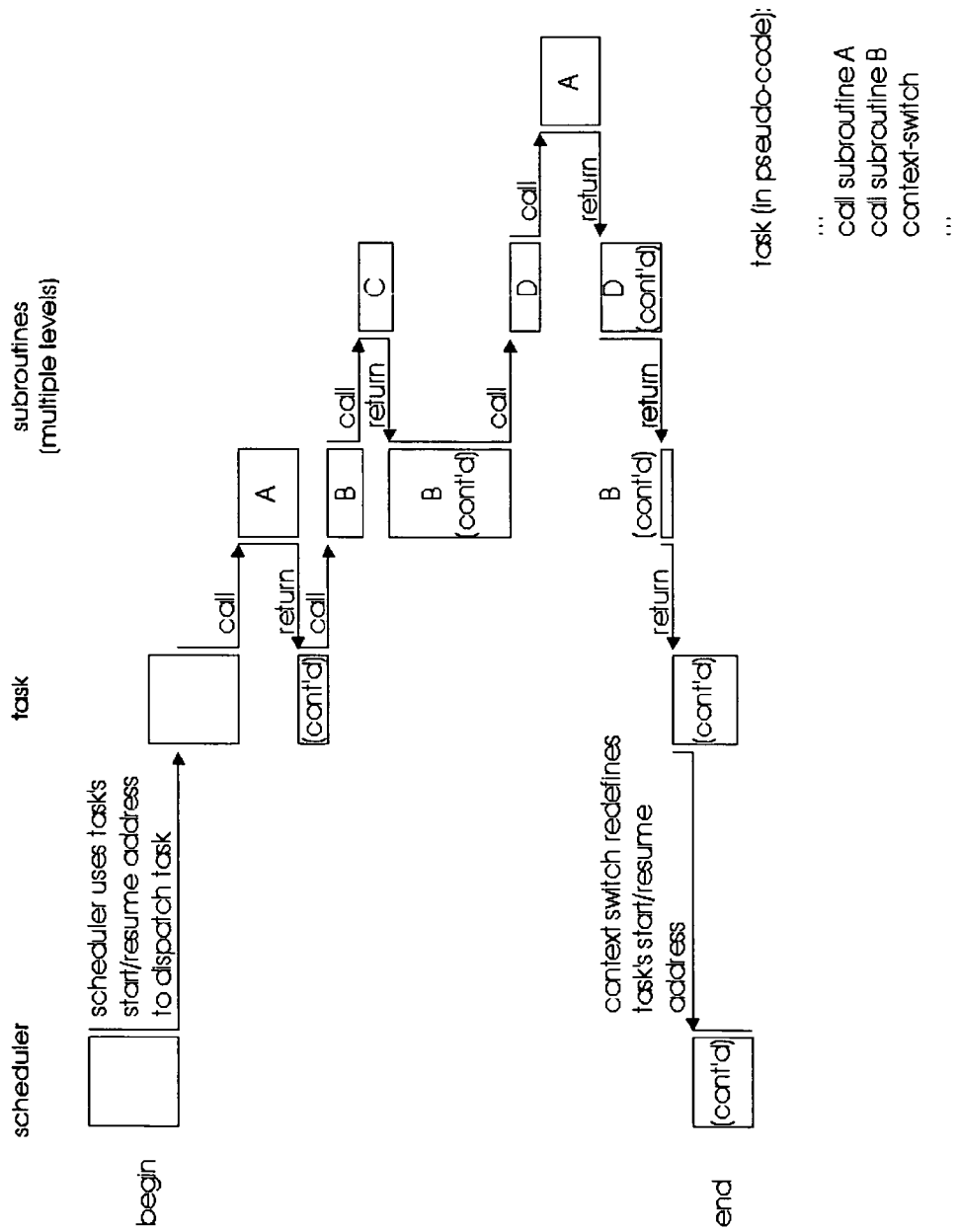
FIG. 4 is a timing illustrating a scheduler, a task, its subroutines, and a context switch, in an embodiment of the present invention.

In the matter of context-switching at task-level only, which is unique to embodiments of the present invention, FIG. 4 is a diagram illustrating the scheduler, the task, its subroutines, and the context switch. The scheduler is used to dispatch (i.e. run) the task. It does so by transferring control of program execution from within the scheduler to within the task, at the location (address) specified by the current value of the task's start/resume address. This change of the program counter (PC) can be implemented in a variety of ways, including (but not limited to) direct manipulation of the program counter or a subroutine call.

The task's start/resume address is typically intialized to the start of the task (i.e. the task's entry point) when the task is created, and is subsequently redefined by its context switch (es), if any. Each unique instance of the context switcher within a task has a start/resume address associated with it.

In FIG. 4 the scheduler is shown dispatching a single task. The task begins running at a location (address) beyond the start of the task. This may be because this is not the first time the scheduler has dispatched this task. The task in turn calls subroutines A and B. Subroutine B calls subroutines C and D, and subroutine D calls subroutine A. After calling subroutine B the task performs a context switch which returns program execution to the scheduler.

Note that the task continues beyond where the context switch occurred. Therefore the next time the task runs, it will resume execution after the location (address) of the context switch in FIG. 4.

Since only a single start/resume address is stored per task, all context switches must occur at the task level, i.e. at the root level of the task and not within any subroutines it may call. If a context switch were to occur, say, in task D above, storage for two return addresses (an address in subroutine B (from subroutine D) and an address in the task (from subroutine B)) and a start/resume address for the task would be necessary.

It is seen, therefore, that context switches are only allowed at the task level because a single start/resume address is stored per task, and the task always returns (via a return instruction or other method) to the scheduler. Subroutines can be called to any depth from within the task.

Following a context switch, which now can occur only at task level, not within a subroutine of the task at some greater depth, when a task resumes running via the scheduler, it must resume at an appropriate place within the task. A task's start/resume address is usually initialized as the start (entry point) of the task. Therefore, when a context switch occurs, the context switch must redefine the start/resume address so that when the task resumes, it can continue executing as if there had been no interruption.

In the current art, on processors with a stack pointer (SP), the start/resume address is easily obtained. In a preemptive RTOS, the return address of the preempted task is obtained from the stack via the stack pointer and stored in task-specific memory. The process is similar in the cooperative case, and the cooperative RTOS may use stack manipulation or in-line code to obtain an appropriate start/resume address. Since a conventional RTOS presupposes the existence of a general-purpose stack, it also presupposes the existence of a stack pointer, which is at its disposal in order to obtain the proper start/resume address and task stack contents for the preempted task.

On processors without a stack pointer, the start/resume address must be obtained in a different way. One well-known method is to obtain the current value of the program counter (PC) at the task level, and manipulate it via in-line instructions in order to store the appropriate start/resume address. Processors, assemblers and compilers have varying degrees of support for accomplishing this action.

In an embodiment of the present invention a new and novel method is provided for obtaining the start/resume address during a context switch. The new method uses a label, placed where the task should resume. Most assemblers and compilers support labels, either local or global in scope. By obtaining the (usually absolute) address of the label and storing it as the task's start/resume address, there is no need for either the stack pointer or the program counter in determining the start/resume address for the particular context switch. Multiple labels can be used within each task to provide for multiple context-switching opportunities.

Following is an example of use of a label in denoting the start/resume address:

```
...(task body)
SaveRtnAddress(Label);
ContextSwitch( );
Label:
...(task body continued)
```

In a preferred embodiment, a single programming macro is defined to create a unique label, save the task's start/resume address in the appropriate task control block and perform the context switch.

Figure 1:
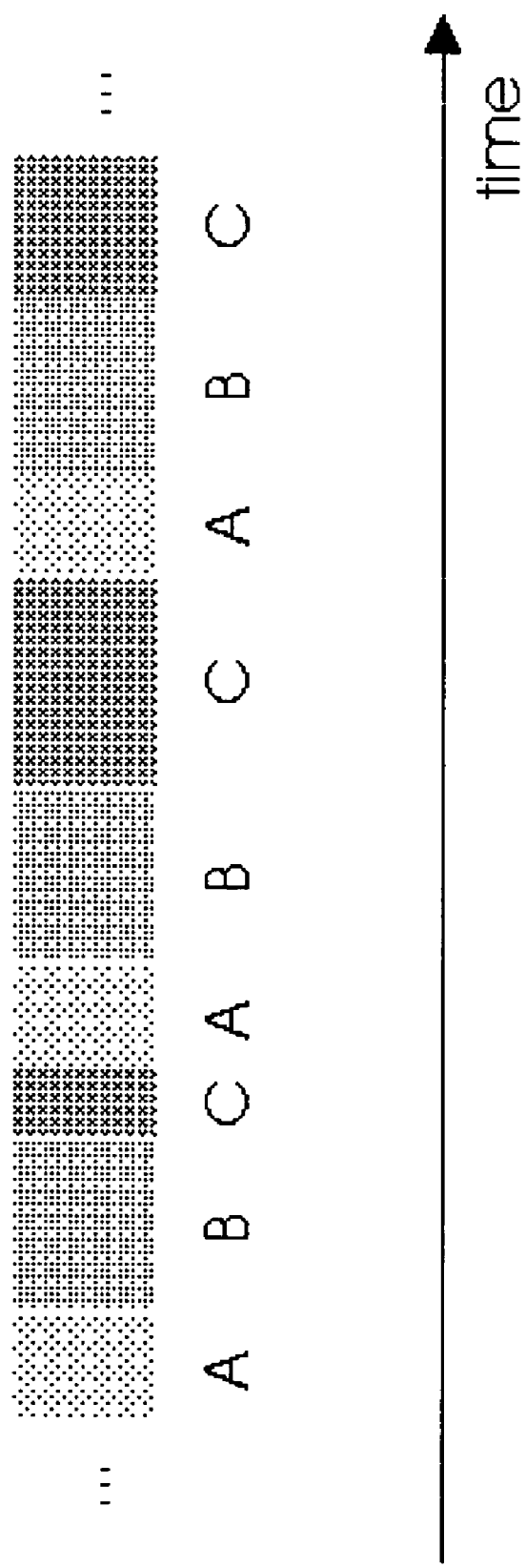
FIG. 1 is a time diagram illustrating a simple sequence of tasks in a loop.
Figure 2:
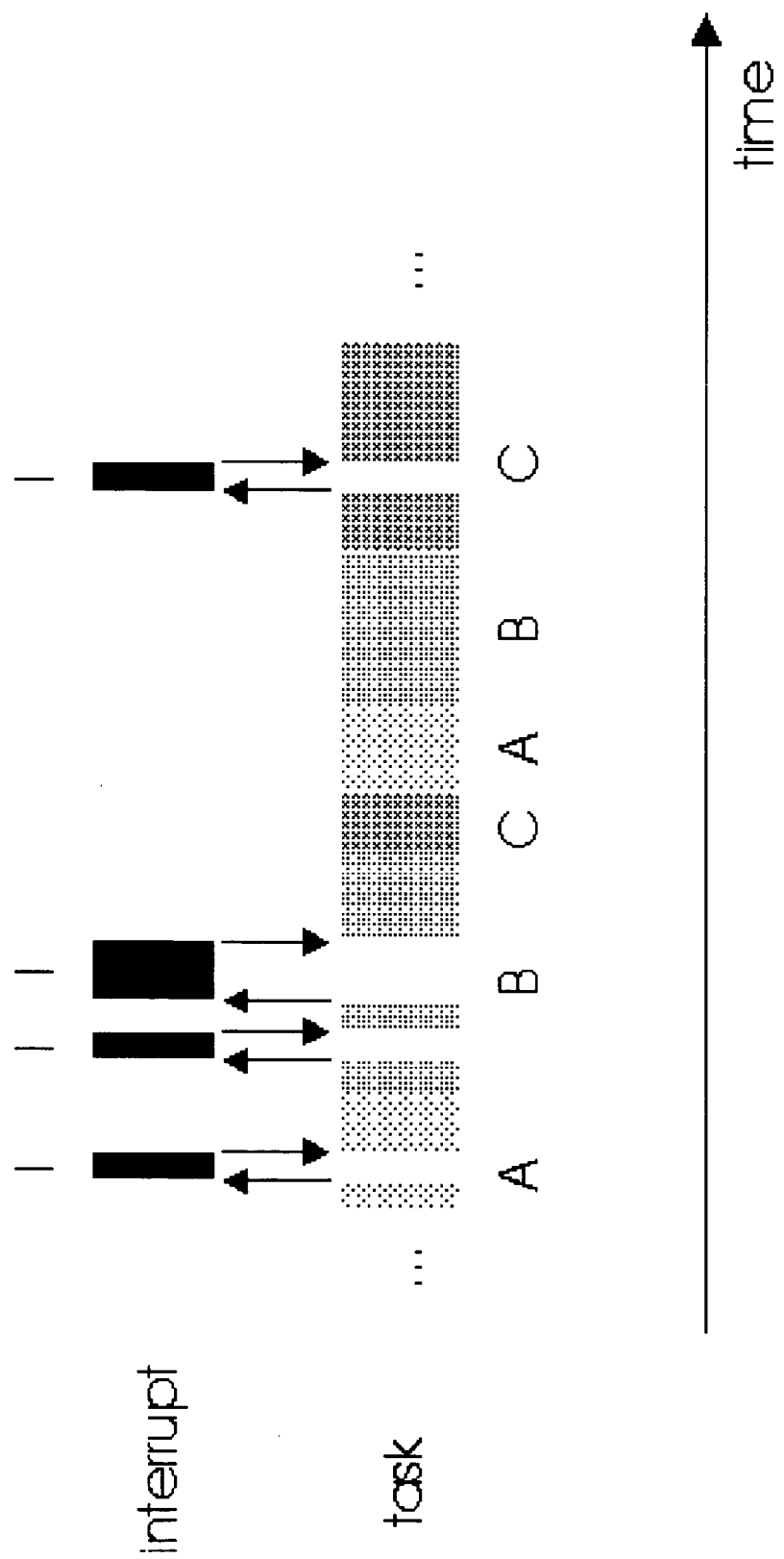
FIG. 2 is a timing diagram similar to that of FIG. 1 illustrating interrupts in the loop of FIG. 1.
Figure 3:
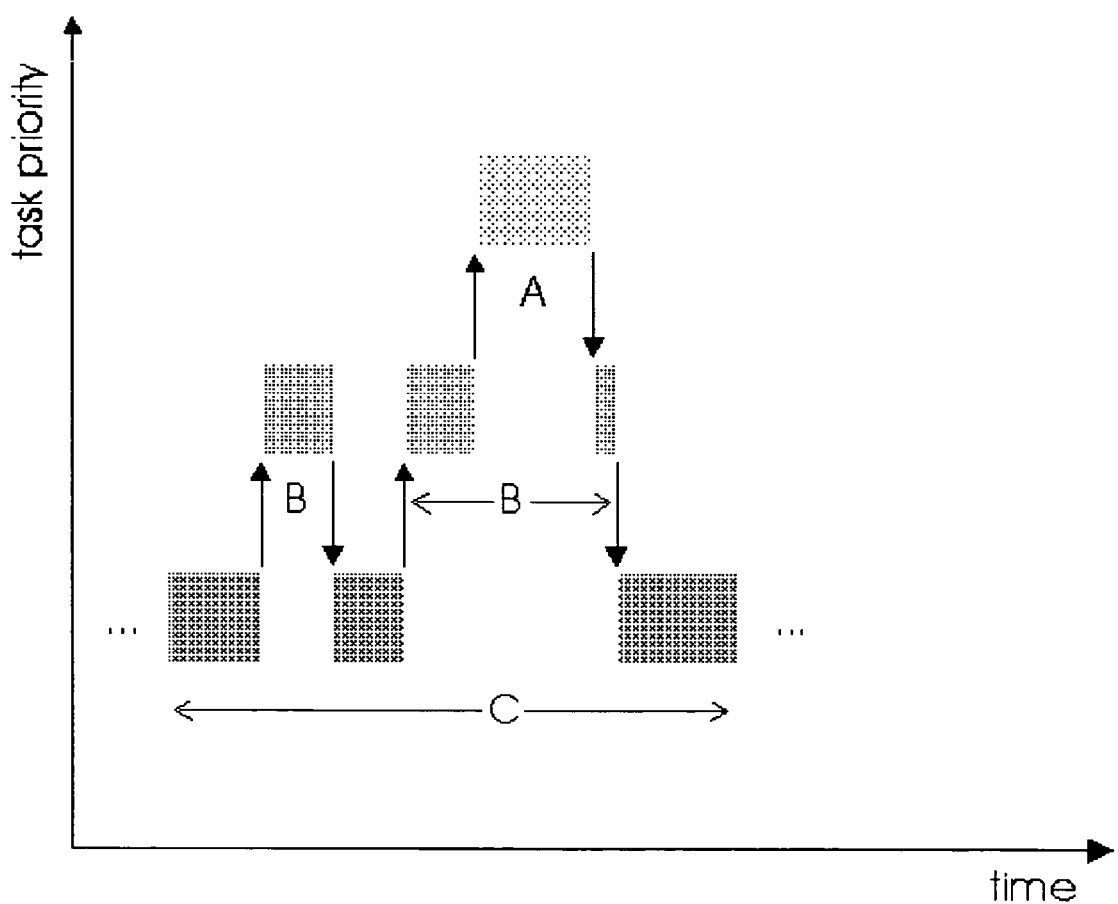
FIG. 3 is a timing diagram illustrating a sequence of execution for a kernel-driven, multitasking system, where tasks are assigned priority.

FIG. 5 illustrates a further example of use of a label to obtain a task's start . . . resume address. In FIG. 2 an example of a novel means of obtaining the start/resume address for a task is shown. In this example of a hypothetical 8-bit microprocessor or microcontroller, the processor has a single working register (W), a 16-bit address space, and each instruction requires one word of program memory. Furthermore, the hypothetical assembler for this processor provides the means of obtaining the high- and low-order bytes of a specified address through the high( ) and low( ) operators. The task's start/resume address is stored in startResumeAddr, a 2-byte (16-bit) memory storage location. Lastly, a context switch begins by storing a start/resume address for the task and then executing the return instruction. The remainder of the context switch occurs in the scheduler and is not shown.

A well-understood method for obtaining a desired address is to use the current value of the program counter, and add to or subtract from that an offset value. The program counter may be available as one of the processor's readable registers, or it may be available through the assembler (often as '$'). Neither of these methods, nor any similar ones involving the program counter, are available to us in this example.

The label resumeHere is assigned a value by the assembler corresponding to its location in program memory. This value is likely to change for each invocation of the assembler due to changes in this task or in other parts of the overall program. In this particular instance, the label's value is 0x024A, an address within the address range containing all of this particular task's instructions. This label is "tied to" this particular context switch within the task, i.e. when the task executes this particular context switch, it will resume executing at resumeHere when it is next dispatched by the scheduler. Therefore the next time the task runs after this particular context switch, it will immediately call subroutine G.

In order to obtain a proper start/resume address for the task, we use the address of the label associated with this particular context switch. The assembler's low( ) and high( ) operators return the 8-bit values of 0x4A and 0x02, respectively, which we store in the task's start/resume address. There is a variety of alternative methods that can be used to redefine the task's start/resume address from a label or address.

FIG. 5 illustrates a case where two context switches are used within a single task. The second context switch uses its own unique label (resumeThere), but is otherwise identical in operation to the first. Using a macro (also shown in FIG. 5) is one possible means of automating the process of obtaining the start/resume address for each context switch.

There is one and only one label associated with each context switch. Each such label represents an address in program memory. The value of the context switch label (i.e. an address) is used to define the task's start/resume address. The program counter is not used to define the task's start/resume address. When created, a task's start/resume address is usually the task's entry point. When running, the task's start/ resume address is usually the value of a label corresponding to a context switch within the task.

A corollary of the novel means of obtaining the start/resume address taught above is that it is unnecessary to disable interrupts while redefining the task's start/resume address. Since it is good practice to minimize the amount of time during which interrupts are disabled, this is a desirable consequence.

Generally speaking, interrupts must be disabled during an operation if either the operation's source or its destination is changed by an interrupt or by interrupts during the operation. During runtime operation, the novel method for obtaining the task's start/resume address for a context switch has as its source the address (label). It has as its destination memory in the task's control block dedicated to storing the task's start/resume address. A label is simply an address with a fixed value. Since the address is a run-time constant, there is no danger of it changing due to interrupts or any other activity during the operation.

A task's start/resume address is changed (written) only in two places —during initialization and in each context switch. Both of these operations are restricted to the background. It is read in only one place. That is in the scheduler, prior to the task being dispatched. It is neither read nor written by any interrupt-related processes in our RTOS. Therefore there is no need to disable interrupts while writing the task's new start/resume address in the context switch.

An alternative method is to pass the address (e.g. in one or more registers) back to the scheduler as part of the context switch, and redefine the task's start/resume address within the scheduler. Once again there is no need to disable interrupts during this part of the context-switching process.

The novel method taught herein uses addresses provided by labels to redefine a task's start/resume address. Additionally, the task's start/resume address is written and read only by background (non-interrupt) code. Therefore there it is unnecessary to disable interrupts while redefining the task's start/resume address.

In another embodiment of the present invention a method is provided for successfully waiting on events without the help of task stacks.

In a conventional RTOS, having a conventional wait-on-event function, a task context-switches when it waits on an event that is not available. This condition is detected by one or more functions of the RTOS. The context switch occurs at an arbitrary level of the call . . . return stack, "inside" the RTOS wait-on-event function. The task will then resume once the event is available. The RTOS is able to context-switch a task inside of an RTOS function because of the existence of the specific task stack, and because the RTOS function is re-entrant.

In the present invention a new method for context-switching based on events, and not requiring the existence of a general-purpose stack is provided. In the new method the status of an event is tested within a new RTOS wait-on-event function. This function is called only at the task level. Based on its return value, a context switch at the task level is either performed (event was not available) or not (event was available). In either case the context switch occurs outside of the RTOS function. Therefore the new wait-on-event function need not be reentrant, leading to a further reduction in RAM requirements.

In an alternative embodiment the abovementioned RTOS wait-on-event function is enclosed within a (while) loop at the task level. In the (while) loop, the task calls the RTOS wait-on-event function and examines its return code. It exits the loop if the event is available and context-switches if it is not. When the task resumes at a later time after having context-switched, it repeats the test since it is still in the loop. If the event is now available, or if other conditions (e.g. timeouts) dictate that the waiting should end, then the task exits the loop and continues. If not, it continues to wait. Through a single instance of (and multiple calls to) the RTOS wait-on-event function, the application program is able to wait on events efficiently despite the lack of a general-purpose stack, which precludes it from context-switching from within RTOS functions.

Following is an example of the code sequence for the new wait-on-event operation:

```
... (task body)
while ( WaitOnEvent(Event) == EVENT_NOT_AVAILABLE ) {
   ContextSwitch( );
{
... (task body continued)
```

In yet another embodiment of the present invention a new method for minimizing the amount of memory required to maintain tasks in linked lists of states which are exclusive of each other is provided.

It is common in a conventional RTOS to have, at any random time, groups of tasks in the same state, for example in the delayed state. Arrays and/or linked lists may be used to group the tasks for the purpose of accessing the highest-priority task of a given state as quickly as possible. Arrays consume relatively large amounts of memory but provide for random access to a given element, and hence are considered to be fast. Linked lists consume relatively little memory, but provide for linear access to a given element, and hence are considered to be slow. Elements of linked lists are linked together via pointers contained in the elements. Each element contains one or more pointers per list. Singly-linked lists use one pointer per element, doubly-linked lists use two, etc. The list itself may also have a handle, which often points to the list's first element (in singly-linked lists) or to an otherwise important element (in doubly-linked lists). Lists are often sorted based on one or more properties of the list elements, e.g. task priority.

It is common in current RTOS design to dedicate one or more unique arrays or lists to all tasks in the same state. For example, a single array might indicate which tasks are eligible to run; another, the delayed tasks. FIG. 6 is such a list in which three types of arrays are used: one to indicate the eligible tasks, one to indicate the delayed tasks, and a third to indicate the tasks waiting for the particular event (one for each event). There is a single instance of the first two types, and multiple instances of the last array type. A task is part of the group if it is represented by a "1" in the array, and not a part of the group is represented by a zero.

Such an array-based scheme requires that enough memory be dedicated to each group to list all of the tasks in the particular state corresponding to the group. This requirement exists regardless of whether no tasks, a few tasks or all the tasks in the system are in the corresponding state. Since tasks can be in only one state at a time, this is an inefficient use of memory.

Figure 7:
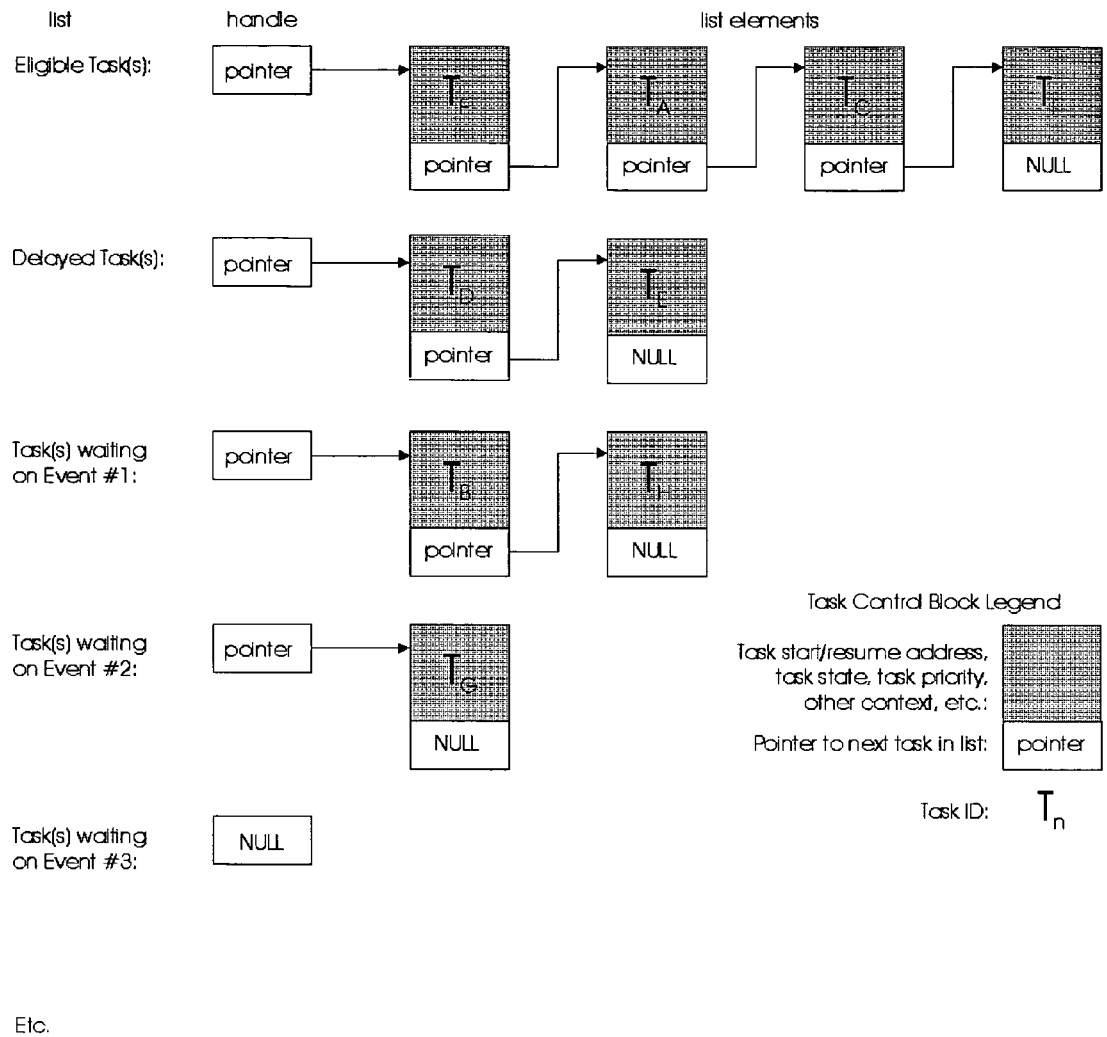
FIG. 7 is a diagram showing linked lists composed exclusively of elements of the same type in an embodiment of the present invention.

In an embodiment of the present invention linked lists are used to group tasks of a particular state. FIG. 7 is a diagram showing linked lists composed exclusively of elements of the same type, e.g. the above-mentioned task control block. Each task can be a member of any one (and only one) of the linked lists at any given time. Thus, with a single pointer or set of pointers in the list element, a task can be a member of any of the corresponding lists without having dedicated list-specific pointers for each state-specific list. Depending on the number of tasks and events, and the memory required to hold a pointer in RAM, this scheme may result in a substantial reduction in the RAM required by the RTOS to maintain the tasks in their respective states.

SuperTimer

Many conventional RTOSs include the concept of a system timer that is used to provide time-based functionality to the application. For example, a system call to delay a task by a specified amount of time will involve the system timer.

The system timer in such a conventional system is often implemented as a function (or collection of functions) that is called at a periodic rate, e.g. 10 Hz. A common means of implementing this is to call the system timer from within a periodic interrupt. In order for the system to avoid errors, the system timer must always complete its operations before the next periodic interrupt. If it fails to do so, those portions of the system using the timer (e.g. delayed tasks, elapsed time counters) may be in error.

It is always good coding practice to minimize the time spent with interrupts disabled. A system timer may operate with interrupts disabled, or will disable interrupts only during so-called critical periods. In systems with processors with limited call . . . return stack depth, however, it is likely that the system timer must execute with interrupts off. This is due to the possibility of stack overflow if interrupts are re-enabled while servicing an interrupt. Therefore in such systems each time the system timer runs it should do so in the shortest possible time.

At any time the system timer may be operating on any number (including 0) of tasks in the system. For example, if two tasks are delayed, and the rest are eligible, running or waiting for an event, one possible implementation of an RTOS would have the system timer counting down the delays of the two delayed tasks. It is often the case that the more tasks the system timer must handle, the longer it will take to run.

A problem arises when the system timer takes too long to perform its operations, and therefore time- and interrupt-related errors occur in the system.

In an embodiment of the present invention a novel means of structuring operation of a system timer is provided to avoid these problems. The inventor this embodiment a SuperTimer.

The idea behind the SuperTimer in this embodiment of the invention is to split up its operations so that it operates on only one task at a time, regardless of how many tasks require its services. It is then run at a correspondingly higher rate, so that the net effect is that it will complete all the timer-based operations for all the tasks requiring timer-based services within the allotted time. The advantage is that the system can now do other things (e.g. service other interrupts) between calls to the system timer.

Figure 8:
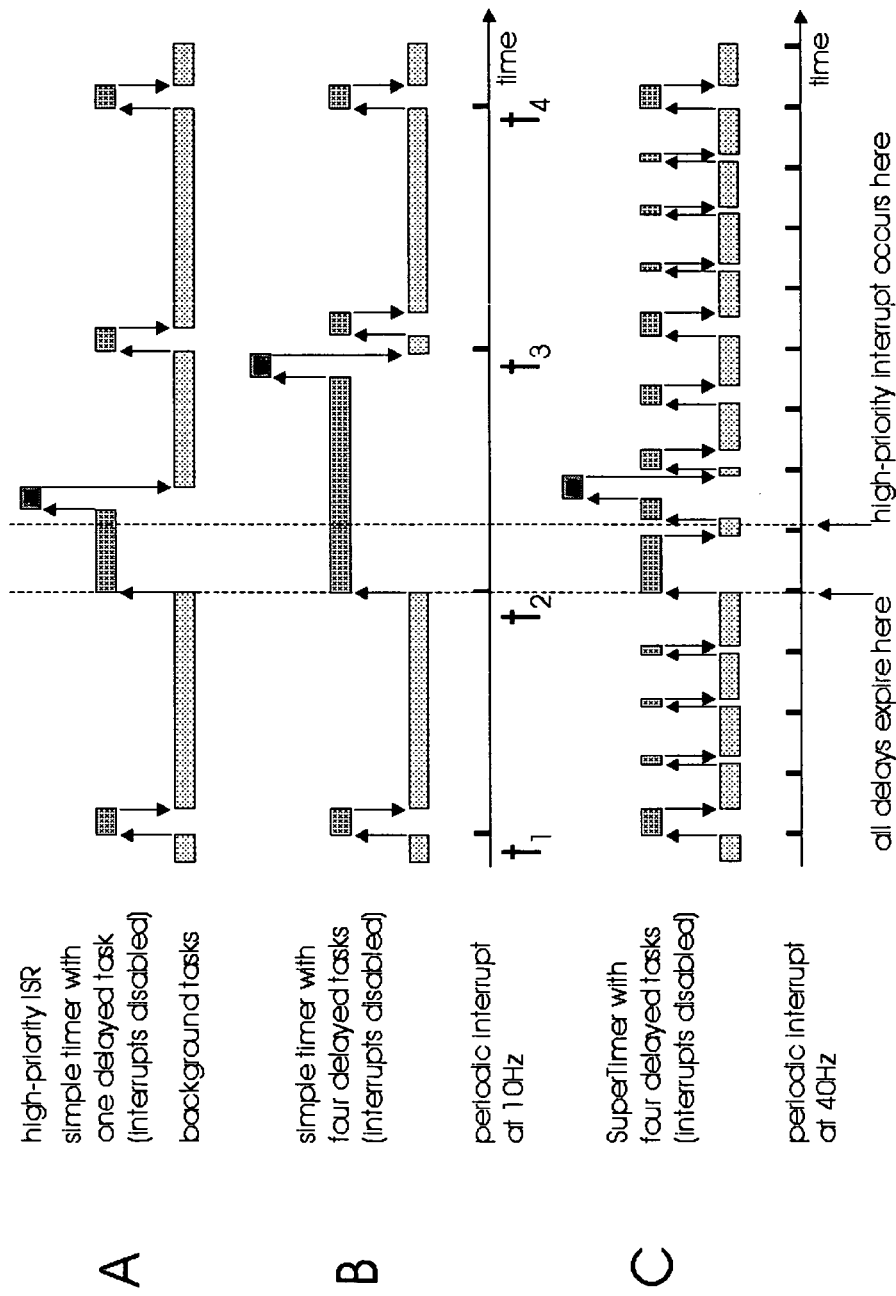
FIG. 8 is a diagram illustrating operation both of a conventional system timer and a SuperTimer in an embodiment of the present invention.

FIG. 8 is a diagram illustrating operation both of a conventional system timer and a SuperTimer. The example system has up to 4 tasks that can be delayed. Each timer is called from within a periodic interrupt. Additionally, a high-priority interrupt is shown with the interrupt service routine (ISR) that services it. Interrupt (foreground) and task (background) processes are shown. All delays expire simultaneously, simulating a worst-case and entirely possible situation for the system timer. The system timer's resolution is 100 ms.

Part A of FIG. 8 illustrates the case wherein a single task is delayed. When the delay expires, the system timer takes a reasonably small amount of time to process this task. During the processing, when interrupts are disabled, a higher-priority interrupt occurs. As soon as the system timer is finished, and therefore interrupts are re-enabled, the higher-priority interrupt is serviced by its ISR. In this case the delay (latency) between the occurrence of the high-priority interrupt and the servicing of the interrupt by its ISR is acceptable.

Part B of FIG. 8 illustrates the case wherein the system timer handles the situation of four delayed tasks timing out simultaneously. Here, interrupts are disabled for an unacceptably long time while the system timer processes the four delayed tasks. The net result is that the high-priority interrupt is not serviced until long after it has occurred. In some systems, this delay (interrupt latency) would be considered unacceptable.

Part C of FIG. 8 illustrates the SuperTimer in action in an embodiment of the present invention. Since there are up to four tasks whose delays may expire simultaneously, the timer is run at 4 times the rate of the standard system timer, i.e. the SuperTimer is called every 25 ms. Most of the time there is very little to do in the timer when it is called during the "extra cycles" (i.e. not at $t_1$, $t_2$, $t_3$ or $t_4$). When the tasks expire, each call to the SuperTimer results in a single delayed task being processed. The four delayed tasks are still processed within the original 100 ms time period. However, since the SuperTimer never runs for more than 25 ms, and hence interrupts are not disabled for more than 25 ms, the system's response to the high-priority interrupt is much better than that of Parts A and B.

Use of the SuperTimer minimizes the amount of time spent in the system timer with interrupts disabled. The SuperTimer processes only one task per call to the SuperTimer, and must be called at a faster rate than the normal system timer.

It will be apparent to the skilled artisan that there are a variety of alterations that may be made in the embodiments of the invention described herein without departing from the spirit and scope of the invention. For example, the exact code that may be used by different programmers to accomplish the functionality in the disclosed invention may vary, while the functionality still falls within the description provided herein. Therefore the invention should be afforded the broadest scope, and is limited only by the claims that follow.

What is claimed is:

1. A real-time operating system (RTOS) for use with a minimal-memory controller, comprising:
   a kernel managing task execution, including context switching, executing from a machine readable medium on the controller; and
   a plurality of defined tasks as code sets, individual ones of the tasks having subroutines callable in nested levels for accomplishing tasks;
   characterized in that the kernel allows context switching to occur only at task level, rather than allowing context switches at a lower sub-routine level by saving only a single return address per task.

2. The RTOS of claim 1 wherein the RTOS operates with a single call-return stack common to all of the defined tasks.

3. The RTOS of claim 2 wherein the single stack is implemented as a general-purpose stack.

4. The RTOS of claim 2 wherein the single stack is implemented as a hardware call-return stack.

5. The RTOS of claim 2 comprising a specific task control block assigned to each task, wherein a single task-resume address is saved.

6. The RTOS of claim 1 wherein processor state information is also saved.

7. The RTOS of claim 5 wherein a task-resume address is obtained in a context switch by placing a label at the point where the task is to resume, and obtaining the address of the label and storing that address as the task-resume address.

8. The RTOS of claim 7 wherein multiple labels are used within a single task to accomplish multiple context switches.

9. The RTOS of claim 1 further comprising a wait-on-event function characterized in that the function is called only at task-level, returns a value based on whether an event is available or not, and initiates a context switch or not based on the returned value.

10. The RTOS of claim 1 further comprising a wait-on-event function enclosed within a (while) loop at task level, and characterized in that the task calls the wait-on-event function in the loop and examines its return code, exiting the loop if the event is available and initiates a context switch if not, and in the event of a context switch, the task recalls the wait-on-event function after resumption, being still in the loop, and repeats this procedure until exiting the loop.

11. A method for operating a minimal-memory controller comprising steps of:
(a) executing by the controller, from a machine-readable medium, a real-time operating system (RTOS) based on kernel-controlled multitasking;
(b) calling defined tasks by the kernel, with individual ones of the tasks calling component subroutines; and
(c) allowing context-switching to occur only at the task level rather than at any lower sub-routine level, by saving only a single return address per task.

12. The method of claim 11 wherein the RTOS operates with a single call-return stack common to all of the defined tasks.

13. The method of claim 12 wherein the single stack is implemented as a general-purpose stack.

14. The method of claim 12 wherein the single stack is implemented as a hardware call-return stack.

15. The method of claim 12 comprising a specific task control block assigned to each task, wherein a single task-resume address is saved.

16. The method of claim 11 wherein processor state information is also saved.

17. The method of claim 15 wherein a task-resume address is obtained in a context switch by placing a label at the point where the task is to resume, and obtaining the address of the label and storing that address as the task-resume address.

18. The method of claim 17 wherein multiple labels are used within a single task to accomplish multiple context switches.

19. The method of claim 11 further comprising a wait-on-event function characterized in that the function is called only at task-level, returns a value based on whether an event is available or not, and initiates a context switch or not based on the returned value.

20. The method of claim 11 further comprising a wait-on-event function enclosed within a (while) loop at task level, and characterized in that the task calls the wait-on-event function in the loop and examines its return code, exiting the loop if the event is available and initiates a context switch if not, and in the event of a context switch, the task recalls the wait-on-event function after resumption, being still in the loop, and repeats this procedure until exiting the loop.

\* \* \* \* \*